(12) United States Patent
Cohen

(10) Patent No.: US 6,311,183 B1
(45) Date of Patent: Oct. 30, 2001

(54) METHOD FOR FINDING LARGE NUMBERS OF KEYWORDS IN CONTINUOUS TEXT STREAMS

(75) Inventor: Jonathan Drew Cohen, Hanover, MD (US)

(73) Assignee: The United States of America as represented by the Director of National Security Agency, Washington, DC (US)

( * ) Notice: Subject to any disclaimer, the term of this patent is extended or adjusted under 35 U.S.C. 154(b) by 0 days.

(21) Appl. No.: 09/353,235

(22) Filed: Jul. 14, 1999

Related U.S. Application Data

(60) Provisional application No. 60/095,648, filed on Aug. 7, 1998.

(51) Int. Cl.[7] .................................................. G06F 17/30
(52) U.S. Cl. ................................ 707/6; 707/100; 704/9; 704/10
(58) Field of Search ..................... 707/6, 100; 704/1–10

(56) References Cited

PUBLICATIONS

J. Y. Kim and J. Shawe–Taylor, "Fast String Matching using an n–gram Algorithm," Software—Practice and Experience, 24, 79–88 (1994).*

J. D. Cohen, "Recursive Hashing Functions for n–Grams," ACM Transaction on Information Systems, 15, 291–320 (1997).*

A. V. Aho and M. J. Corasick, 'Efficient String Matching: An Aid to Bibliographic Search,' *Communications of the ACM*, 18 (1975), reprinted in *Computer Algorithms: string pattern matching strategies,* Jun–ichi Aoe, ed., IEEE Computer Press, Los Alamitos, CA, pp. 78–85 (1994).

B. Commentz–Walter, 'A String Matching Algorithm Fast on the Average,' Proceedings of the International Colloquium on Automata, Languages and Programming, Lecture Notes in Computer Science, 71, H. A. Mauer, ed., Springer–Verlag, Berlin (1979).

R. Baeza–Yates and M. Régnier, 'Fast Algorithms for Two Dimensional and Multiple Pattern Matching,' *SWAT 90, 2nd Scandinavian Workshop on Algorithm Theory,* Lecture Notes in Computer Science, 447, J. R. Gilbert and R. Karlsson, eds., Springer–Verlag, Berlin, pp. 332–347 (1990).

R. N. Horspool, 'Practical Fast Searching in Strings,' *Software—Practice and Experience,* 10, 501–506 (1980).

R. A. Baeza–Yates, 'Improved String Searching,' *Software—Practice and Experience,* 19, 257–271 (1989).

J. Y. Kim and J. Shawe–Taylor, 'Fast String Matching using an n–gram Algorithm,' *Software—Practice and Experience,* 24, 79–88 (1994).

J. D. Cohen, 'Recursive Hashing Functions for n–Grams,' *ACM Transactions on Information Systems,* 15, 291–320 (1997).

\* cited by examiner

Primary Examiner—Hosain T. Alam
Assistant Examiner—Joon Hwan Hwang
(74) Attorney, Agent, or Firm—Stephen M. Bloor

(57) ABSTRACT

A method of full-text scanning for matches in a large dictionary of keywords is described, suitable for SDI (selective dissemination of information). The method is applicable to large dictionaries (hundreds of thousands of entries) and to arbitrary byte sequences for both patterns and sample streams. The approach employs Boyer-Moore-Horspool skipping, extended to pattern collections and digrams, followed by an n-gram hash test, which also identifies a subset of feasible keywords for conventional pattern matching at each location of a putative match.

3 Claims, 5 Drawing Sheets

METHOD FOR FINDING LARGE NUMBERS OF KEYWORDS IN CONTINUOUS TEXT STREAMS

This application claims the benefit of U.S. Provisional Application No. 60/095,648, filed Aug. 7, 1998.

FIELD OF THE INVENTION

This invention relates to the fields of text processing and selective dissemination of information (SDI), and specifically to the field of rapid and massive string matching, also referred to as pattern matching.

BACKGROUND OF THE INVENTION

The current flood of e-mail, newsgroup postings, and other network broadcasts has renewed interest in SDI (selective dissemination of information) systems, in which text samples are run against relatively static subscriber profiles. A text sample that satisfies a profile is selected and subsequently routed to the appropriate subscriber.

Selection is often done by matching keywords specified in the profiles. In advance of processing any sample text, words of interest are compiled in a dictionary. Each text sample is then processed by a keyword scanner, which consults the dictionary, looking for matches between dictionary words and substrings of the text. More generally, the text sample may be a sample stream consisting of arbitrary bytes, and the dictionary may consist of keywords or patterns of an arbitrary nature. In practice, such a keyword scanner need accommodate a large number of arbitrary keywords (say, ten thousand to one hundred thousand) and rapidly produce a vector of alarms, identifying keywords found and each occurrence location in the sample stream. Other processes may then use the alarm vector for selection and routing purposes.

The prior art contains several methods for searching a sample stream for all occurrences of dictionary keywords. One of the most successful approaches is the Aho-Corasick algorithm (A. V. Aho and M. J. Corasick, 'Efficient String Matching: An Aid to Bibliographic Search,' Communications of the ACM, Vol.18, 1975, reprinted in Computer Algorithms: string pattern matching strategies, Jun-ichi Aoe, ed., IEEE Computer Press, Los Alamitos, Calif., pp. 78–85, 1994). The Aho-Corasick algorithm implements a finite state machine, which undergoes a transition with each byte read from the sample stream. When states representing the ends of keywords are reached, the keyword matches are reported. The Aho-Corasick algorithm must read every byte in the sample stream, limiting the speed unacceptably. It also requires a great deal of memory for fast operation.

An alternative method was disclosed by Commentz-Walter (B. Commentz-Walter, 'A String Matching Algorithm Fast on the Average,' Proceedings of the International Colloquium on Automata, Languages and Programming, Lecture Notes in Computer Science, Vol. 71, H. A. Mauer, ed., Springer-Verlag, Berlin, 1979) and improved by Baeza-Yates and Régnier (R. Baeza-Yates and M. Régnier, 'Fast Algorithms for Two Dimensional and Multiple Pattern Matching,' SWAT 90, 2nd Scandinavian Workshop on Algorithm Theory, Lecture Notes in Computer Science, Vol. 447, J. R. Gilbert and R. Karlsson, eds., Springer-Verlag, Berlin, pp. 332–347, 1990). This method, too, employs a finite state machine, driven by bytes taken backwards from a pivot point in the sample stream. Unlike the Aho-Corasick algorithm, it may "skip" (without examinination) some of the sample stream bytes by advancing the pivot by more than one byte, but it is slowed by the need to revisit bytes already examined. For large dictionaries, revisiting dominates skipping, and it is slower than the algorithm of Aho-Corasick. It has memory requirement commensurate with the Aho-Corasick algorithm.

Other methods require the use of special-purpose hardware to be competitive.

SUMMARY OF THE INVENTION

In consideration of the problems detailed above and the limitations enumerated in the partial solutions thereto, an object of my invention is to provide a method for locating all matches of a keyword dictionary in a sample stream.

Another object of my invention is to accommodate large dictionaries of keywords.

A further object of my invention is to accommodate arbitrary byte strings as keywords.

A still further object of my invention is to locate keywords rapidly by not examining every sample stream byte.

In order to attain the objectives described above, according to an aspect of my invention, there is provided a method for locating all matches of a keyword dictionary in a sample stream using n-grams of length n, the steps of which are summarized below.

My method moves forward through the sample stream, considering sample positions as locations for the termination of one or more keywords. As it examines a sample position, it applies a sequence of tests. The early tests hope to reject possible locations before more computationally expensive tests need be applied; the final tests explicitly attempt to match a few remaining candidate keywords to the sample.

The first test employs an extension to digrams and to dictionaries of the method of Boyer-Moore-Horspool skipping (R. N. Horspool, 'Practical Fast Searching in Strings,' Software—Practice and Experience, Vol. 10, 501–506, 1980). Consider the problem of locating keyword $k=k_1k_2 \ldots k_m$ in the sample stream $s=s_1s_2s_3 \ldots$, Horspool describes a method for locating a single keyword in the sample stream by testing successively advancing alignments in the sample stream. For each test alignment, the sample stream byte aligned with the last byte $k_m$ in the keyword is examined. Denote this sample stream byte by c. If c is not present in the keyword, then no match can occur at the current alignment and the next feasible alignment is m bytes to the right, since any intermediate alignment would attempt to match c with one of the keyword bytes known not to be c. More generally, if the last occurrence of c in the keyword is $k_j$, then the next feasible alignment is m−j bytes to the right. To facilitate scanning for the single keyword using this observation, one can make a skip table $T_0$, indexed by byte values, with entries defined by $$T_0[c] = \begin{cases} \min\{m - j \mid k_j = c\}, & c \in k \\ m, & c \notin k. \end{cases}$$

All occurrences of the keyword may be located in the following manner: begin alignment at position m. Let c always denote the sample stream byte at the current alignment position. If $T_0[c]$ is nonzero, move the alignment $T_0[c]$ bytes to the right and repeat until $T_0[c]$ is zero. If $T_0[c]$ is zero, examine the remaining sample stream bytes aligned with the keyword, reporting any matches that have occurred. Advance alignment 1 byte to the right and repeat. This process is rapid, because it permits examination of all feasible alignments, while permitting some bytes in the sample stream to be "skipped" without examination.

This process may be extended to a dictionary of multiple keywords $D=\{k^1, k^2, \ldots, k^{|D|}\}$, with $k^i = k_1^i k_2^i \ldots k_{m_i}^i$, aided by a new skip table $$T_1[c] = \begin{cases} \min_{i, 0 \leq j \leq m_i} \{m_i - j \mid k_j^i = c\}, & c \in D \\ \min_i \{m_i\}, & c \notin D, \end{cases}$$

where $$\min_i \{m_i\}$$

is the minimum keyword length. The procedure for finding feasible alignments is similar to the method for a single keyword, the differences being the use of skip table $T_1$ rather than $T_0$, and the fact that more keywords must be tested at each feasible alignment. Again, speed is gained by skipping whenever $T_1[c]$ is greater than zero.

In practice, this method will not serve well for large dictionaries. First, the entries in $T_1$ usually get smaller as the dictionary increases, with most becoming zero, making skipping too rare to be useful. Second, one is still faced with testing the many keywords at each feasible alignement. The first limitation may be overcome by extending Boyer-Moore-Horspool skipping to digrams. The second limitation may be addressed by terminal n-gram sorting of keywords. Both of these aspects of my invention will be described below.

Boyer-Moore-Horspool skipping may be extended to digrams as follows: Given the sample position p, one may ask whether the digram $d = s_{p-1} s_p$ terminates a keyword and, if not, how far the sample position may be advanced before a feasible alignment does occur. To answer this question rapidly, one constructs a skip table $T_2$ similar to $T_1$ above, but addressed by the digram d, such that a zero value of $T_2[d]$ indicates a feasible alignment, and a nonzero value specifies the skip that may be applied before reaching the next feasible alignment. In particular, for each possible value of the digram $d = c_1 c_2$, the skip table is given the value $$T_2[d] = \min\left\{\min_{i, 1 \leq j \leq m_i}\{m_i - j \mid k_{j-1}^i = c_1, k_j^i = c_2\}, \min_i\{m_i - 1 \mid k_1^i = c_2\}, \min_i\{m_i\}\right\}. \quad \text{(Eq. 1)}$$

(The minimum of the empty set is taken to be infinite.) The skip table is then employed as outlined above: an alignment terminating at a sample position is tested by extracting the digram d terminating at the sample position and skipping (advancing) the sample position by $T_2[d]$, repeating the process until $T_2[d]$ is zero, at which time additional testing is performed. Using digrams for skipping extends the effective dictionary capacity immensely, since the space of likely digrams is not exhausted as quickly as the space of monograms.

Those skilled in the art will recognize that such an extension is not limited to digrams; however, in most practical situations, digrams are sufficient.

Extensions of Boyer-Moore-Horspool skipping for locating single keywords were proposed by Baeza-Yates (R. A. Baeza-Yates, 'Improved String Searching,' *Software—Practice and Experience*, Vol. 19, 257–271, 1989) and Kim and Shawe-Taylor (J. Y. Kim and J. Shawe-Taylor, 'Fast String Matching using an n-gram Algorithm,' *Software—Practice and Experience*, Vol. 24, 79–88,1994). Their work does not suggest the accommodation of multiple keywords.

Once a feasible alignment is reached, that is, once the digram terminating at the current sample position gives $T_2[d]=0$, one must still test all keywords for a match terminating at the current sample position. Such a test may be made more practical by partitioning the keywords according to a rapidly recognized feature in the sample stream at the current sample position. My invention employs n-grams for this purpose. An n-gram is an n long sequence of consecutive bytes. The use of n-grams is common in the information retrieval field and is well understood to those skilled in the art. Information about n-grams may be stored and retrieved rapidly by the use of a hash table, addressed by using a hash value of the n-gram as an index. In particular, my invention partitions the keywords by their terminal n-grams, and uses the sample stream n-gram terminating at the sample position to select the keyword partition for further examination.

More explicitly, choose $$n = \min_i \{m_i\},$$

the minimum keyword length. If the n-gram in the sample stream, terminating a the sample position, is g, then any keyword matching the sample, such that its last byte aligns with the sample position, must also terminate in g. Thus, to test all keywords for a match at the sample pointer, it is sufficient to test those ending in g. Accordingly, in advance of processing, the dictionary is partitioned, placing in each partition keywords sharing a terminal n-gram. Each partition is then represented by a search structure, which is recorded in a hash table, using the terminal n-gram as a key. This hash table is termed the subset table. When processing, after digram skipping locates a feasible alignment, the n-gram terminating at that alignment is used to retrieve the appropriate searching structure from the subset table. If no search structure is recorded for the given n-gram, then the alignment is abandoned, otherwise, the retrieved search structure is used to test the small set of possible keywords having the given terminal n-gram.

In general, the value of n may be chosen to be any number less than or equal to the shortest keyword length. Performance for very long minimum keyword length may be better if n is taken to be smaller.

For testing the small set of possible keywords, any method known to those skilled in the art, compatible with keywords having a common terminal point, may be employed. The nature of the search structures recorded for this purpose in the subset table will depend upon the method employed.

When recording search structures in the subset table, one may choose either to resolve hashing collisions or to merge multiple search structures that hash to the same location. The latter choice is likely to result in better performance.

My invention also exploits the rapid hashing of n-grams to achieve rapid operation. As disclosed by Cohen (J. D. Cohen, 'Recursive Hashing Functions for n-Grams,' *ACM Transactions on Information Systems*, Vol.15, 291–320, 1997), the examination of adjacent n-grams offers an opportunity for rapid hashing, since adjacent n-grams share all but one byte. If the hash function h is chosen well, then one may calculate the hash function recursively, that is, the hash value of each n-gram may be calculated from the hash value of its predecessor, in a manner that is faster than calculating hash functions from scratch. In particular, Cohen describes a recursive method for hashing n-grams, wherein $$h(g_i) = R[h(g_{i-1})] + L_1[s_i] - L_2[s_{i-n}], \quad \text{(Eq. 2)}$$

where $L_1$ and $L_2$ are simple lookup tables and R is a simple operation such as a barrel shift. When skipping is not excessive, equation (2) may be used to update the n-gram hash value; otherwise, the hash function is calculated from scratch. In terms of the quantities of equation (2), the scratch calculation may be performed by implementing $$a_1 = L_1[s_{i-(n-1)}],$$
$$a_2 = R[a_1] + L_1[s_{i-(n-2)}],$$
$$\vdots$$
$$a_{n-1} = R[a_{n-2}] + L_1[s_{i-1}],$$
$$a_n = R[a_{n-1}] + L_1[s_i],$$
$$h(g_i) = a_n.$$
(Eq. 3)

According to these observations and an aspect of my invention, there is provided a method for locating all matches of a keyword dictionary in a sample stream using n-grams of length n, comprising the steps of building a skip table from the dictionary; building a subset table from the dictionary; and, thereafter, examining the sample stream using successive values of a sample position, with the sample position serving as a pointer in the sample stream, and reporting any matches terminating at each of said sample position values. The latter step further includes the steps of: initializing said sample position to n; terminating the process if the sample position is greater than the length of the sample stream; extracting a sample digram equal to the digram in the sample stream terminating at said sample position; extracting a sample skip value from said skip table by using said sample digram as an index; for the case of said sample skip value not being zero, skipping said sample position by incrementing said sample position by said sample skip value and returning to the step of terminating the process if the sample position is greater than the length of the sample stream; otherwise, for the case of said sample skip value being zero, computing a sample n-gram hash value from the n-gram terminating at said sample position in the sample stream; thereafter, for the case of the entry in said subset table at the location indexed by said sample n-gram hash value being empty, incrementing said sample position by 1 and returning to the step of terminating the process if the sample position is greater than the length of the sample stream; otherwise, for the case of the entry in said subset table at the location indexed by said sample n-gram hash value containing one of said search structures, producing match reports for matches of keywords terminating at said sample position, using said one of said search structures; thereafter, incrementing said sample position by 1; and returning to the step of terminating the process if the sample position is greater than the length of the sample stream.

BRIEF DESCRIPTION OF THE DRAWINGS

My invention may be best understood by reading the specification with reference to the accompanying figures, in which.

DESCRIPTION OF THE PREFERRED EMBODIMENTS

Figure 1:
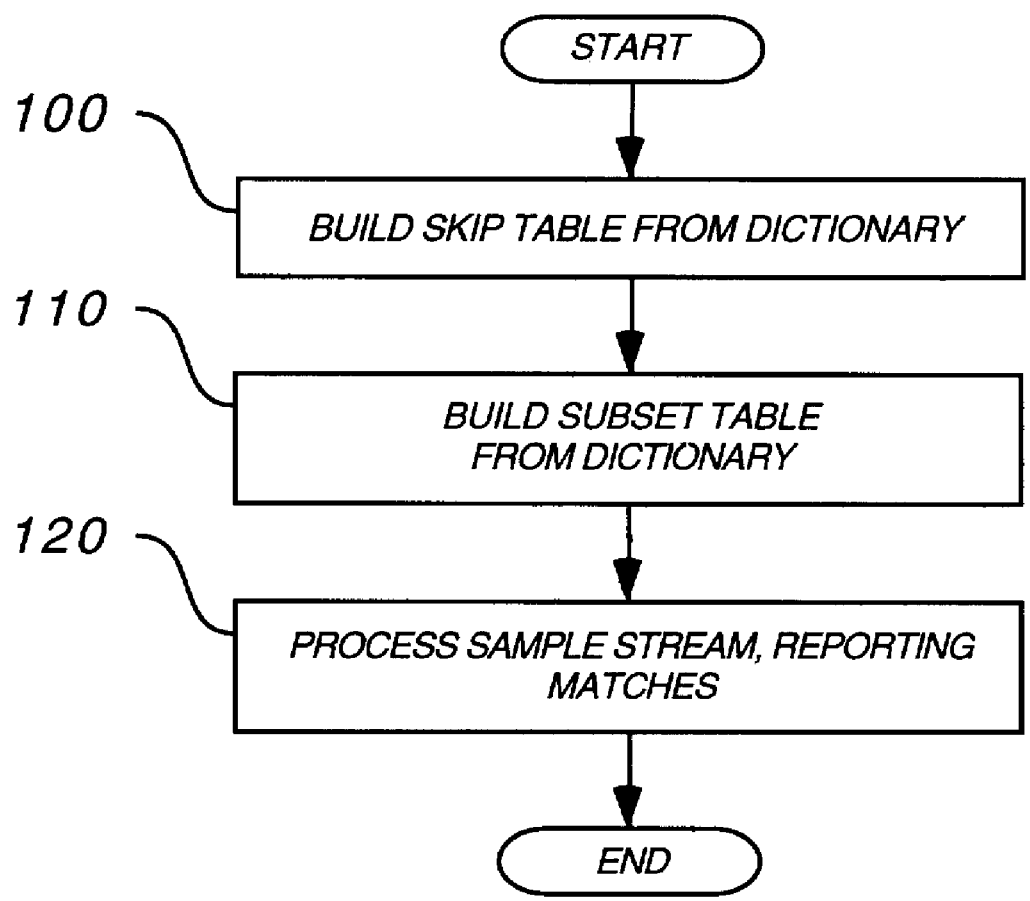
FIG. 1 is a block diagram of a high level description of my invention.

A high level diagram of my invention is shown in FIG. 1. Two preparatory steps are conducted at the outset A skip table, indexed by digrams, is constructed from the dictionary in step 100. The skip table's preferred entries are given by equation (1); step 100 includes the calculation of these entries by any of the many methods known to those skilled in the art. In step 110, a subset table is constructed from the dictionary. Steps 100 and 110 may be preformed in either order, or may be performed simultaneously. Thereafter, step 120 processes the sample stream, using the skip table and subset table to report matches.

Figure 2:
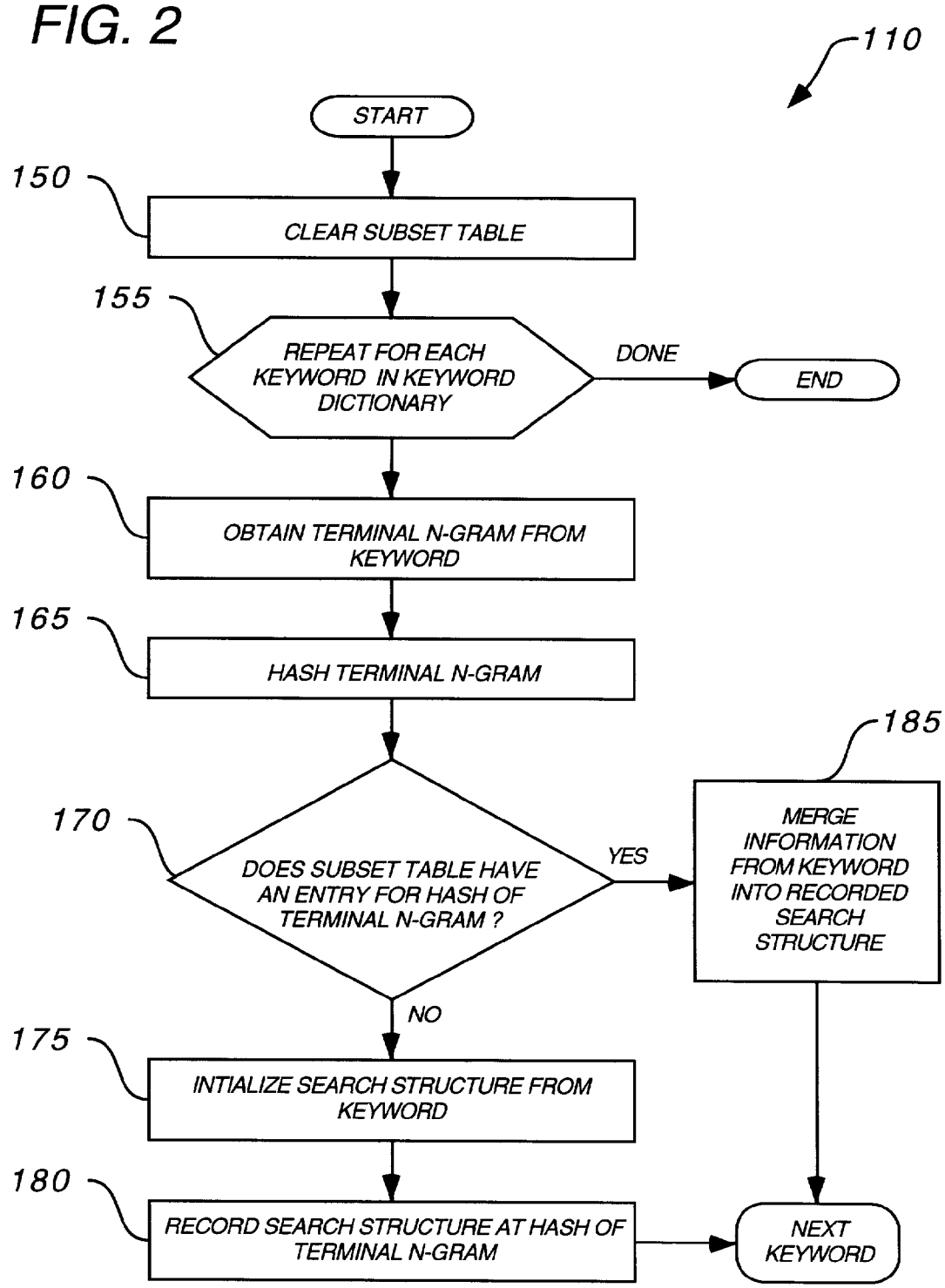
FIG. 2 is a preferred embodiment of initialization step 110 (build subset table from dictionary)

A preferred embodiment of step 110 is pictured in FIG. 2. Initially, an empty subset table is formed (step 150). Step 155 loops through all keywords of the dictionary, one at a time, so that steps 160 through 185 may be performed on each keyword in turn. For each such keyword, the following steps are performed: First, the terminal n-gram is extracted from the keyword in step 160, from which a hash value is calculated (step 165). The hash value is then used as an index into the subset table to test (step 170) whether a search structure has been recorded in the indexed bin. If not, then a new search structure is formed from the keyword (step 175) and recorded in the subset table at the location identified by the hash value (step 180). Otherwise, if the indexed bin contains a search structure, the keyword's contents are merged into that search structure (step 185).

The nature of the search structures is determined by details of step 250, described below.

It should be understood that the purpose of step 110 is merely to prepare the subset table for subsequent processing. Details of the method employed to achieve that preparation are immaterial to my invention, and the steps for a preferred embodiment outlined above are for illustration purposes only.

Figure 3:
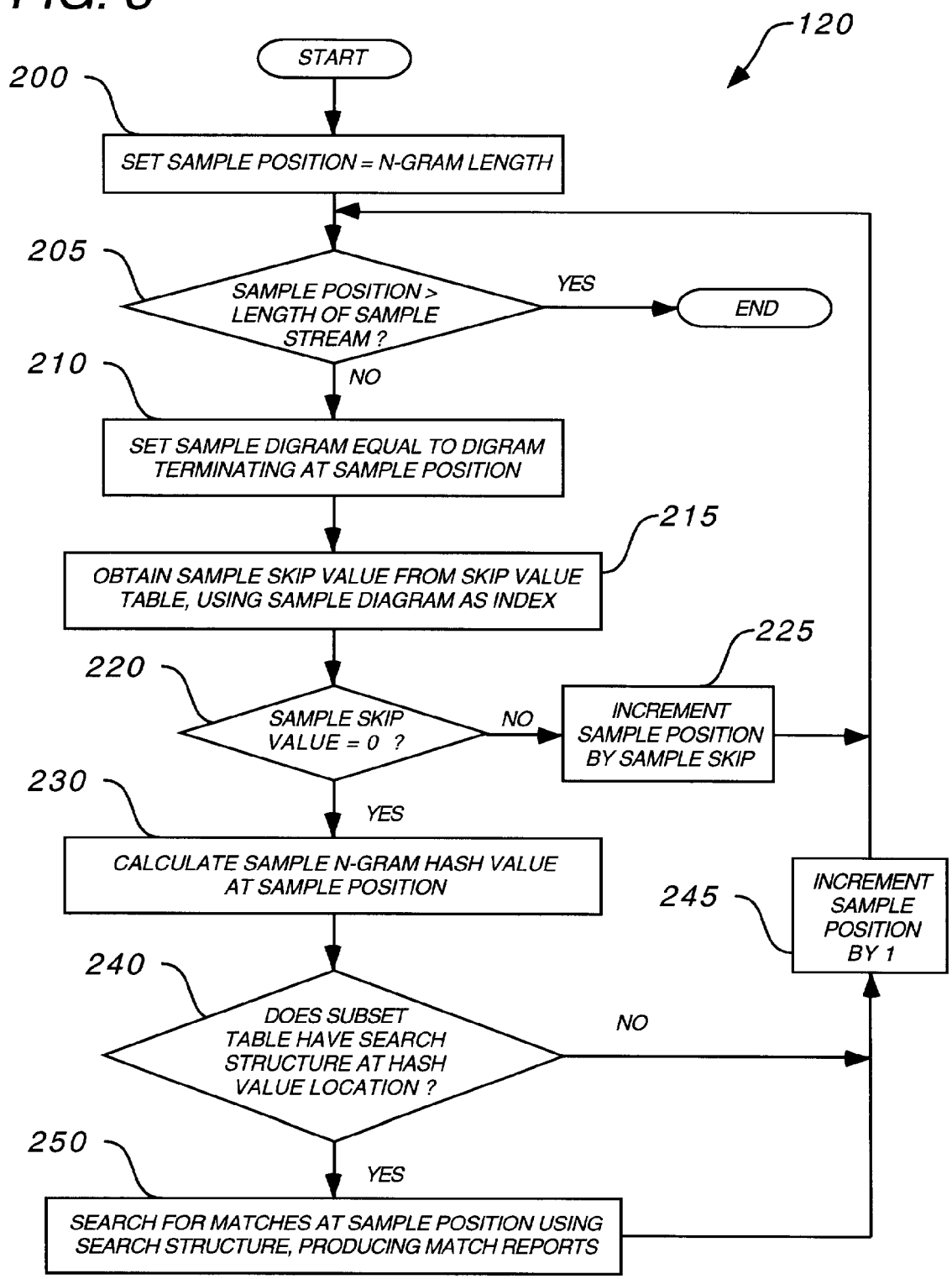
FIG. 3 is block diagram illustrating the processing step of my invention in its preferred generality.

FIG. 3 is a preferred embodiment of step 120, and illustrates the crux of my invention. The processing method moves through the sample stream, examining candidate alignments for keywords, identified by a sample position, which, at all times, points at the byte serving as the terminus of a putative match. At the outset (step 200) the sample position is set to the n-gram length n. Thereafter, in step 205, the sample position is compared to the length of the sample stream, and the process is stopped if the sample position is found to be the larger of the two numbers. If not, then the sample digram is set in step 210 by extracting, from the sample stream, the digram terminating at the sample position. This digram serves as an index into the skip table, from which a skip value is read in step 215. If the skip value is nonzero (tested by step 220), the sample position is skipped by the skip value (step 225), and the method returns to step 205. Otherwise, if the skip value is zero, the hash value of the n-gram terminating at the sample position is calculated in step 230. If the entry indexed by the hash value in the subset table is empty (tested by step 240), then the sample position is incremented by 1 without skipping (step 245) and the method returns to step 205. Otherwise, the search structure contained in the entry indexed by the hash value in the subset table is used to locate and report matches among the subset of keywords recorded in the searching structure (step 250).

Step 250 may be implemented by a variety of methods known to those skilled in the art, and the details of the searching structures recorded for that purpose in the subset table are determined by implementation of step 250. As an example, the keywords may be recorded as a reversed trie, which may serve as all or part of the searching structure. Step 250 would then traverse that trie, driven by bytes drawn in reverse from the sample stream, beginning at the sample position.

In addition, step 250 may employ various signature guard tests to speed rejection of putative matches. For example, the searching structure could contain a signature whose bits are set by the byte proceeding the terminal n-gram in each keyword represented by the searching structure, with each byte value mapping to a bit in the signature. (A keyword shorter than n+1 bytes would cause all bits in the signature to be set.) The signature is then tested against the byte in the sample preceding the n-gram, by looking for its mapping bit to be set. If the bit is not set, the alignment is abandoned before more extensive testing.

Figure 4:
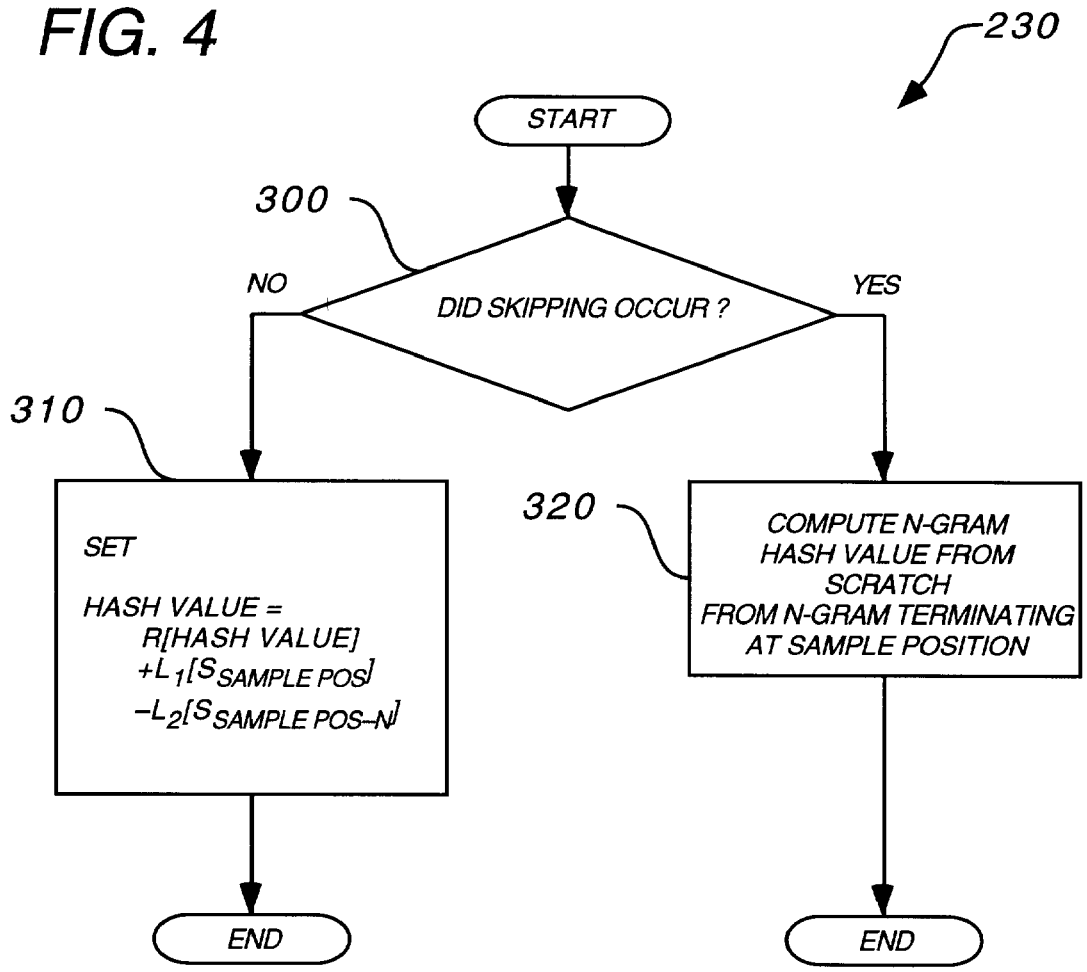
FIG. 4 is a preferred embodiment of step 230 (form sample n-gram hash value at sample position).

FIG. 4 illustrates a preferred embodiment of step 230, which calculates the hash value of the sample n-gram located at the sample position. According to step 300, one of two methods is employed to perform the calculation. If no skipping occurred since the last execution of step 230, then step 310 computes the hash value recursively, using the previous hash value, as outlined in equation (2). Otherwise, the hash value is calculated from scratch from the n-gram terminating at the sample position (step 320). Upon first execution of step 230, skipping is deemed to have occurred.

Figure 5:
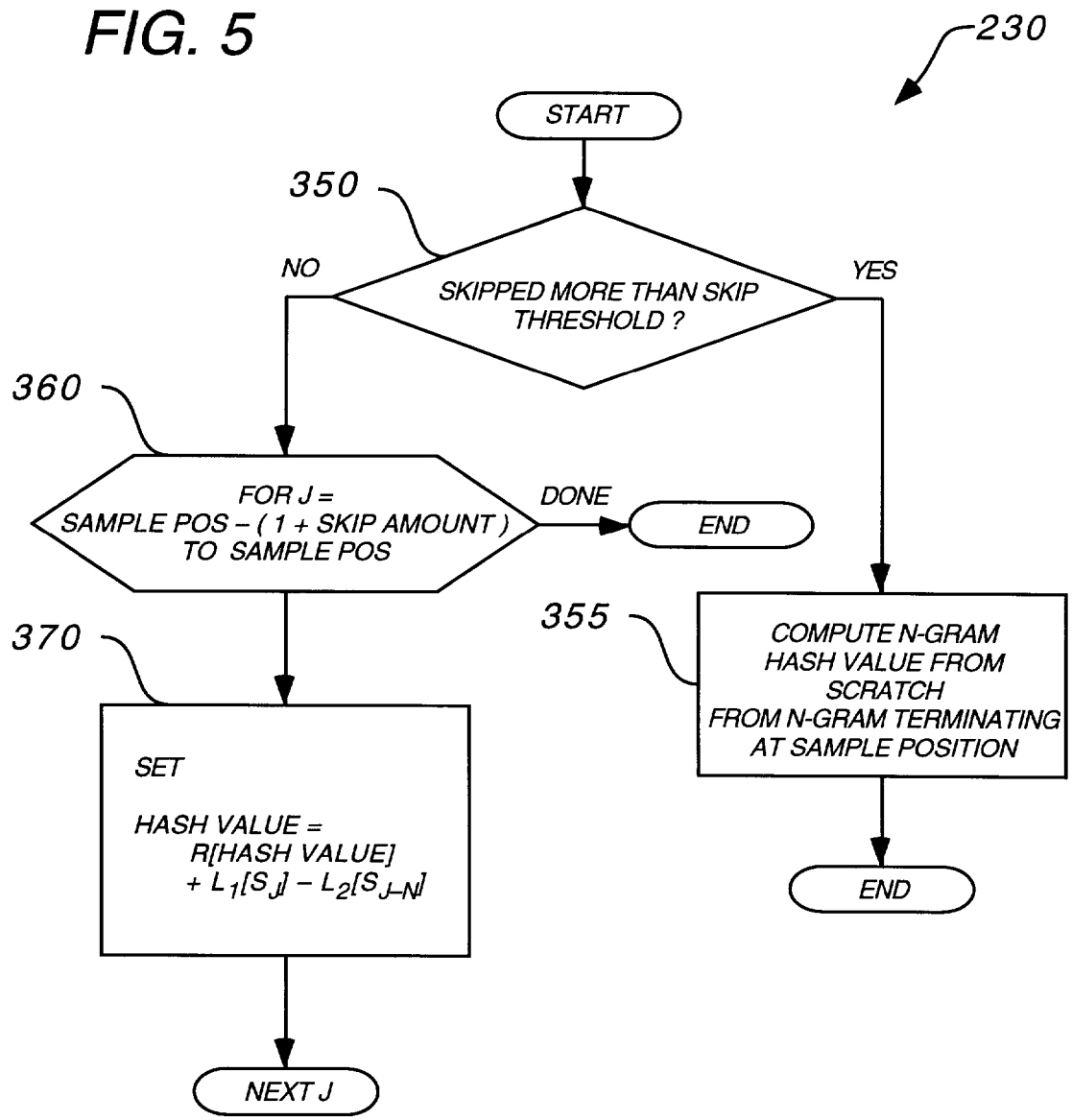
FIG. 5 is an alternative preferred implementation of step 230 (form sample n-gram hash value at sample position).

FIG. 5 illustrates an alternative preferred embodiment of step 230, well suited for longer n-grams. In step 350, the total skipping conducted since the last execution of step 230 is compared to a predetermined skip threshold. If the skip threshold is less than the total skipping conducted since the last execution of step 230, then the hash value is computed from scratch from the n-gram terminating at the sample position (step 355). Otherwise, the hash value is computed recursively from the previous hash value by means of loop step 360, which causes step 370 to be performed one more time than the total skipping conducted since the last execution of step 230. Each time step 370 is executed, the hash value is calculated from the previous hash value, a new byte from the sample stream, and the sample stream byte n bytes earlier, where n is the n-gram length.

The method illustrated in FIG. 4 may be considered a specialization of the method of FIG. 5, with a skip threshold of zero.

It is understood by those skilled in the art that my invention may take many forms differing from the embodiments described herein, and I intend that my invention be limited only by the appended claims and the obvious variations thereof.

I claim:

1. A method for locating all matches of a keyword dictionary in a sample stream using n-grams of length n, comprising the steps of:
   (a) building tables from the keyword dictionary, including the steps of:
      (i) constructing a skip table, indexed by all possible digrams, such that for each digram d, the entry indexed by said digram d is the minimum number of bytes in any sample that could separate said digram d and the next feasible termination of a keyword in the keyword dictionary; and
      (ii) constructing a subset table, addressed by the space of hash values of n-grams, such that each entry addressed by the hash value of the terminal n-gram of at least one keyword in the keyword dictionary contains a search structure, said search structure representing all keywords in the keyword dictionary whose terminal n-grams have hash values addressing the entry holding said search structure; and
   (b) thereafter, examining the sample stream using successive values of a sample position, serving as a pointer in the sample stream, and reporting any matches terminating at each of said sample position values, including the steps of:
      (i) initializing said sample position to n;
      (ii) terminating the process if the sample position is greater than the length of the sample stream;
      (iii) extracting a sample digram equal to the digram in the sample stream terminating at said sample position;
      (iv) extracting a sample skip value from said skip table by using said sample digram as an index;
      (v) for the case of said sample skip value not being zero, skipping said sample position by incrementing said sample position by said sample skip value and returning to step (b)(ii);
      (vi) for the case of said sample skip value being zero, computing a sample n-gram hash value from the n-gram terminating at said sample position in the sample stream;
      (vii) thereafter, for the case of the entry in said subset table at the location indexed by said sample n-gram hash value being empty, incrementing said sample position by 1 and returning to step (b)(ii);
      (viii) for the case of the entry in said subset table at the location indexed by said sample n-gram hash value containing one of said search structures, producing match reports for matches of keywords terminating at said sample position, using said one of said search structures;
      (ix) thereafter, incrementing said sample position by 1; and
      (x) returning to step (b)(ii).

2. A method for locating all matches of a keyword dictionary in a sample stream using n-grams of length n according to claim 1, wherein said step of computing a sample n-gram hash value from the n-gram terminating at said sample position in the sample stream includes the steps of:
   (a) for the case in which skipping occurred since the last execution of said step of computing a sample n-gram hash value from the n-gram of the sample stream terminating at said sample position, computing, from scratch, said sample hash value, said computation involving a linear contribution by each byte in said n-gram terminating at said sample position; and
   (b) for the case in which skipping did not occur since the last execution of said step of computing a sample n-gram hash value from the n-gram of the sample stream terminating at said sample position, updating said sample n-gram hash value recursively by combining its previous value, the byte at said sample position in the sample stream and the byte that is n bytes before the byte at said sample position in the sample stream.

3. A method for locating all matches of a keyword dictionary in a sample stream using n-grams of length n according to claim 1, wherein said step of computing a sample n-gram hash value from the n-gram terminating at said sample position in the sample stream includes the steps of:
   (a) for the case in which total skipping since the last execution of said step of computing a sample n-gram hash value from the n-gram of the sample stream terminating at said sample position exceeds a predetermined skip threshold, computing, from scratch, said sample hash value of the n-gram, said computation involving a linear contribution by each byte in said n-gram terminating at said sample position; and (b) for the case in which total skipping since the last execution of said step of computing a sample n-gram hash value from the n-gram of the sample stream terminating at said sample position does not exceed said predetermined skip threshold, performing the following steps:

(i) setting a recursion index equal to said sample position less one more than said total skipping since the last execution of said step of computing a sample n-gram hash value from the n-gram of the sample stream terminating at said sample position;

(ii) updating said sample n-gram hash value recursively by combining its previous value, the byte at said recursion index in the sample stream and the byte that is n bytes before the byte at said recursion index in the sample stream;

(iii) incrementing said recursion index; and (iv) in the case that said recursion index is less than or equal to said sample position, returning to step (ii).

* * * * *